US012179210B2

(12) United States Patent
Lundgren

(10) Patent No.: US 12,179,210 B2
(45) Date of Patent: Dec. 31, 2024

(54) LIBRIXER COMMINUTOR AND PARTICLE AIR CLASSIFIER SYSTEM

(71) Applicant: Librixer AB, Mölnlycke (SE)

(72) Inventor: Eric L. Lundgren, Västra Frölunda (SE)

(73) Assignee: Libriixer AB, Mölndal (SE)

(*) Notice: Subject to any disclaimer, the term of this patent is extended or adjusted under 35 U.S.C. 154(b) by 239 days.

(21) Appl. No.: 17/608,112

(22) PCT Filed: Jun. 18, 2020

(86) PCT No.: PCT/EP2020/067040
§ 371 (c)(1),
(2) Date: Nov. 1, 2021

(87) PCT Pub. No.: WO2020/254538
PCT Pub. Date: Dec. 24, 2020

(65) Prior Publication Data

US 2022/0219174 A1 Jul. 14, 2022

Related U.S. Application Data

(60) Provisional application No. 62/864,801, filed on Jun. 21, 2019.

(51) Int. Cl.
*B02C 23/20* (2006.01)
*B02C 13/14* (2006.01)
(Continued)

(52) U.S. Cl.
CPC .............. *B02C 23/20* (2013.01); *B02C 13/14* (2013.01); *B02C 13/288* (2013.01); *B04C 5/02* (2013.01);
(Continued)

(58) Field of Classification Search
CPC ....... B04C 9/00; B04C 2009/005; B04C 3/06; B02C 13/14; B02C 13/288; B02C 23/20; B02C 2013/28609
See application file for complete search history.

(56) References Cited

U.S. PATENT DOCUMENTS 3,204,882 A 7/1965 Vifian et al.
3,981,454 A 9/1976 Williams
(Continued)

FOREIGN PATENT DOCUMENTS

CN 87103124 B * 8/1988
CN 104368434 A * 2/2015 ............. B03B 11/00
(Continued)

OTHER PUBLICATIONS

Translation of DE-102011008757 (Year: 2012).*

*Primary Examiner* — Bobby Yeonjin Kim
(74) *Attorney, Agent, or Firm* — Macheledt Bales LLP; Jennifer L. Bales

(57) ABSTRACT

A discharge arrangement (120) for a comminution reactor assembly (100). The discharge arrangement (120) comprises a main chamber (202) extending along a main axis (124). The main chamber has an inlet (121) arranged to be fluidly connected to a comminution reactor (110) and an outlet (122) arranged opposite from the inlet (121) along the main axis (124) and closeable by a common material take-out valve (204). The main chamber (202) is arranged to support a fluid-material stream (123) along a helical path about the main axis (124) from the inlet (121) towards the outlet (122). The discharge arrangement (120) further comprises an airduct (206) arranged extending into the main chamber (202) at an acute angle (a) with respect to the main axis (124). The airduct (206) comprises an aperture arranged facing the outlet (122). Thereby, a portion (125) of the fluid-material stream (123) changes direction from the helical fluid-mate-
(Continued)

rial stream (123) about the main axis (124) from the inlet (121) towards the outlet (122) to a helical flow inside the airduct (206).

20 Claims, 6 Drawing Sheets

(51) Int. Cl.

| | |
|---|---|
| ***B02C 13/288*** | (2006.01) |
| ***B04C 5/02*** | (2006.01) |
| ***B04C 5/081*** | (2006.01) |
| ***B04C 5/13*** | (2006.01) |
| ***B04C 5/15*** | (2006.01) |
| ***B04C 9/00*** | (2006.01) |
| ***B07B 7/086*** | (2006.01) |
| *B02C 13/286* | (2006.01) |

(52) U.S. Cl.

CPC ................ *B04C 5/081* (2013.01); *B04C 5/13* (2013.01); *B04C 5/15* (2013.01); *B04C 9/00* (2013.01); *B07B 7/086* (2013.01); *B02C 2013/28609* (2013.01); *B04C 2009/002* (2013.01)

(56) References Cited

U.S. PATENT DOCUMENTS

| | | | |
|---|---|---|---|
| 6,405,948 | B1 | 6/2002 | Hahn et al. |
| 2010/0059609 | A1 | 3/2010 | Teeter et al. |
| 2013/0126647 | A1 | 5/2013 | Arnold et al. |

FOREIGN PATENT DOCUMENTS

| | | | | | |
|---|---|---|---|---|---|
| CN | 109046811 | A | * | 12/2018 | ............... B04C 9/00 |
| CN | 110508387 | A | * | 11/2019 | ............... B02C 1/04 |
| DE | 102011008757 | | | 7/2012 | |
| DE | 102011008757 | A1 | * | 7/2012 | ............. B07B 11/06 |
| DE | 102016117384 | A1 | * | 3/2018 | ............. B07B 11/02 |
| EP | 0050330 | | | 7/1987 | |
| EP | 0634219 | A1 | * | 1/1995 | |
| EP | 0852911 | | | 11/1999 | |
| EP | 3213820 | | | 6/2017 | |
| GB | 1165250 | | | 5/1953 | |
| KR | 2010/0076624 | | | 7/2010 | |
| KR | 20100076624 | A | * | 7/2010 | |
| KR | 101513054 | B1 | * | 4/2015 | ............. B02C 13/14 |
| WO | 2019/023647 | | | 1/2019 | |
| WO | WO-2020249824 | A1 | * | 12/2020 | ............... B01D 1/16 |

* cited by examiner

LIBRIXER COMMINUTOR AND PARTICLE AIR CLASSIFIER SYSTEM

TECHNICAL FIELD

The present disclosure relates to apparatus and methods for comminuting materials. In particular, there is disclosed herein apparatus and methods for comminuting materials along natural boundaries.

BACKGROUND

Known milling techniques and apparatus, such as roller-, hammer- and ball mills, are based on either impact, shear or compression forces or a combination thereof. Such forces mimic what nature has done for millions of years creating variably sized round particles with passive surfaces. Biological materials are broken, and its interiors spilled and exposed to degradation.

Typical devices for comminuting (or pulverizing) materials include a rotatable shaft within a housing where material is introduced into one end of the housing, the rotor plates sequentially spin and agitate the material. The pulverized material is removed from the other end of the housing. Another alternative, the entire housing is rotated vertically or horizontally and with the help of grinding media processed material is comminuted.

There is a need for improved apparatus and methods for comminuting materials along natural boundaries.

SUMMARY

It is an object of the present invention to provide improved apparatus and methods for comminuting materials along natural boundaries, called the Librixer comminutor system.

As described in prior art by the inventor, the material to be processed together with either a gas or a liquid "the process fluid" enter the Librixer from one or more feed openings at the top of the vertical equipment. Upon entering the very first process chamber (a process chamber can also be referred to as a reactor chamber) and following below process chambers this mix is exposed to an arsenal of low energy high frequency forces introduced in a linear organized fashion injected with more random chaotic forces. The following process chambers may be identical or commonly different depending on the characteristics of the processed materials and result product requirements.

In an example embodiment of the present disclosure, and as the fluid-material stream exits the final processing chamber in the comminutor it is collected in a cone shaped discharge tube with a common material take out valve. It is preferable that the cone has a length suitable for multiple processes, allowing processed material to accumulate on top of the discharge valve. About one third from the bottom an airduct is attached to the cone (in an embodiment wherein the fluid is air). The inlet to such air discharge cone extends in a lip inwards and down inside the cone. This inside extension will force the air fluid stream to make a very sharp turn from a downward spiral around the inside edges of the cone to an upward spiral inside the airduct. During the sharp turn the air drops heavier particles (either larger or denser particles). These particles drop down to the bottom of the cone above the take-out valve. In a typical configuration operating with certain materials, around 70-90 percent by weight will represent such drop. The remaining 10-30 percent materials together with all the air will move upwards in the air discharge tube beyond the bend and continue inside the vertical airduct where it passes through one or more cone baffles. The fluid-material stream becomes restrained inside the such baffle and both pressure and velocity increase dramatically. Right at the exit from the tube restraining baffle, the fluid-material stream experiences a sudden large increase in air tube diameter and both velocity and pressure will suddenly drop. This sudden change in pressure will force larger and/or more dense particles in the fluid-material stream to drop off and out from the continuing fluid-material stream and such particles are then collected via a circular slot outside the sides of the baffle between baffle and air tube. A number of pneumatic valves around the outside tube will allow these particles to be collected without releasing any air into the ambient atmosphere.

In an example embodiment of the present disclosure, and depending on material and airflow, several similar designed baffles can be stacked within suitable variable distances of each other. The distance between the first baffle and following baffles can be adjusted in length to accommodate optimum particle distribution between the different baffle take-outs. In general each such following baffle system will collect smaller and less dense particles as the airflow continues upwards. The airflow above the very last baffle consists of clean or almost dust free air since most fine particles in the airduct flow have been deposited in one of the classifying baffles before it is allowed to enter the final known art bag house for a final air polishing of ultra fine particles. This baffle system will not only sort the different small particles and classify these in descending size and lesser density but finally allow for a small area bag house for receiving a significantly lesser volume of particles. It is well known in the art that sorting becomes significant more complicated as particles get smaller. Successful systems tend to be very expensive. The Librixer baffle classifier system operating based on particle movements already in existence offer a smart particle air classifier addition at very little cost.

The object of the present disclosure is at least in part obtained by a discharge arrangement for a comminution reactor assembly. The discharge arrangement comprises a main chamber extending along a main axis. The main chamber has an inlet arranged to be fluidly connected to a comminution reactor and an outlet arranged opposite from the inlet along the main axis and closeable by a common material take-out valve. The main chamber is arranged to support a fluid-material stream along a helical path about the main axis from the inlet towards the outlet. The discharge arrangement further comprises an airduct arranged extending into the main chamber at an acute angle with respect to the main axis. The airduct comprises an aperture arranged facing the outlet. Thereby, a portion of the fluid-material stream changes direction from the helical fluid-material stream about the main axis from the inlet towards the outlet to a helical flow inside the airduct.

According to aspects, the discharge arrangement is arranged to generate a pressure gradient configured to draw the portion of the fluid-material stream into the airduct. This may facilitate control of the fluid-material stream 123

According to aspects, the main chamber is configured with a tubular shape arranged to support the helical path fluid-material stream from the inlet towards the outlet.

According to aspects, the main chamber length between inlet and outlet along main axis is between 1000 and 2000 mm. According to further aspects, a volume of the main chamber is between 1 and 1.5 cubic meters According to aspects, the main chamber comprises conical shape arranged to support the helical path fluid fluid-material stream from the inlet towards the outlet. It is preferable that the cone has a length suitable for multiple processes, allowing processed material to accumulate on top of the discharge valve.

According to aspects, the airduct extends into the main chamber at a point about one third of the distance from the outlet to the inlet. According to further aspects, the acute angle is between 60-85 degrees, and preferably between 70-80 degrees, measured with respect to a plane normal to the main axis.

According to aspects, the airduct comprises a bend to change extension direction of the airduct into a direction substantially parallel to the main axis. A first separator is arranged after the bend to separate a fraction of particles from the portion of the helical fluid-material stream.

According to aspects, the first separator is cone baffle arranged to restrain the portion of the helical fluid-material stream. Thereby, the fluid-material stream becomes restrained inside the baffle and both pressure and velocity increase dramatically. Right at the exit from the restraining baffle, the fluid-material stream will experience a sudden large increase in the tube wall diameter and both velocity and pressure will suddenly drop. This sudden change in pressure will force larger or more dense particles to drop off from the continuing fluid-material stream and such particles are then collected via a circular slot outside the sides of the baffle between the baffle and the air tube.

According to aspects, the first separator comprises one or more pneumatic valves arranged to discharge collected particles. A number of pneumatic valves around the outside tube will allow these particles to be collected without releasing any air and dust into the ambient atmosphere.

According to aspects, a plurality of separators is arranged in series after the bend to separate respective fractions of particles from the portion of the helical fluid-material stream. Depending on material and airflow, several similar designed cone baffles can be stacked in a vertical series within suitable adjustable distances between the baffles according to the makeup and velocity of the fluid-material stream. The distance between the first baffle and following baffles can be adjusted in length to accommodate required particle distribution between the different baffle take-outs.

According to aspects, the airduct is terminated by a filter bag compartment 220. As the fluid-material stream exists the last baffle, the remaining ultra-fine particles together with the air is discharged into a conventional bag house.

There is also disclosed herein a comminution reactor assembly comprising a comminution reactor and a discharge arrangement according to any previous claim.

There is also disclosed herein a processing rotor for a comminution reactor. The processing rotor comprises a vane configuration arranged extending beyond a perimeter of a rotor plate to which the vane configuration is mounted. This increases the life of the comminution reactor and the processing rotor, because the fluid mixture pouring over the edge of the processing rotor vane tip does not immediately scrub the underside of the processing rotor. Instead it is travels outward past the perimeter of the processing rotor and minimizes the wear from the fluid-material stream underneath the processing rotor. The vanes may include a round bullnose top that also extends beyond the circumference of the processing rotor, increasing the turbulence of the commuting fluid-material stream above the height of the vanes prior to being gathered and organized within the fluid stream outwards.

There is also disclosed herein a reverse spoon shaped vortex generator for causing vortexes in a material fluid stream spinning in opposition to a main flow of the material passing the vortex generator. The reverse spoon shaped vortex generator comprises a first and a second arcuate surface with respective curvatures. The first and a second arcuate surface are arranged in a mirrored configuration.

One or more reverse spoon shaped vortex generator may be placed in all or some mid points of the flat wall plates, in all or some apex corner within one or all process chambers. Such formed vortex generators placed in the mid-point of the flat wall segment is smaller than any generator placed in the apexes of the processing chamber between two flat wall sections. The innermost edge of all such vortex generators form an inscribed circle allowing space between such circle and a similar circle created by the edges of the polygon shaped rotor. The improved shape resembles two table spoons laid back to back, where the convex sides of the two spoons are touching each other yet allowing the "Coanda Effect" to drag the fluid stream around the front and into the second "secondary" vortex generator side. This secondary vortex generator will be slightly weaker when compared with the primary vortex. Their positions and functions will be reversed should the comminution reactor be run in a counterclockwise direction.

There is also disclosed herein an apparatus for comminuting material. The apparatus comprises a spinnable shaft and rotor plates attached to the shaft. The apparatus further comprises wear plates forming a polygon shaped process chamber parallel to the shaft. The chamber has an inlet surface at an inlet end and a discharge surface at a discharge end. Segmented plates are disposed between the rotors. The segmented plates extend through the wear plates inward toward the shaft. A portion of the segmented plates and adjacent wear plates form an assembly constructed to open away from the shaft and the rotors. The apparatus also comprises a first set of vortex generators formed on the wear plates of the inlet chamber, and a secondary set of vortex generators arranged in each or fewer of the apexes of the polygon shaped process chamber. The vortex generators are constructed and arranged to cause vortexes in the material spinning in opposition to a main flow of the material. At least one vortex generators in the secondary set of vortex generators is a reverse-spoon-shaped vortex generator.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
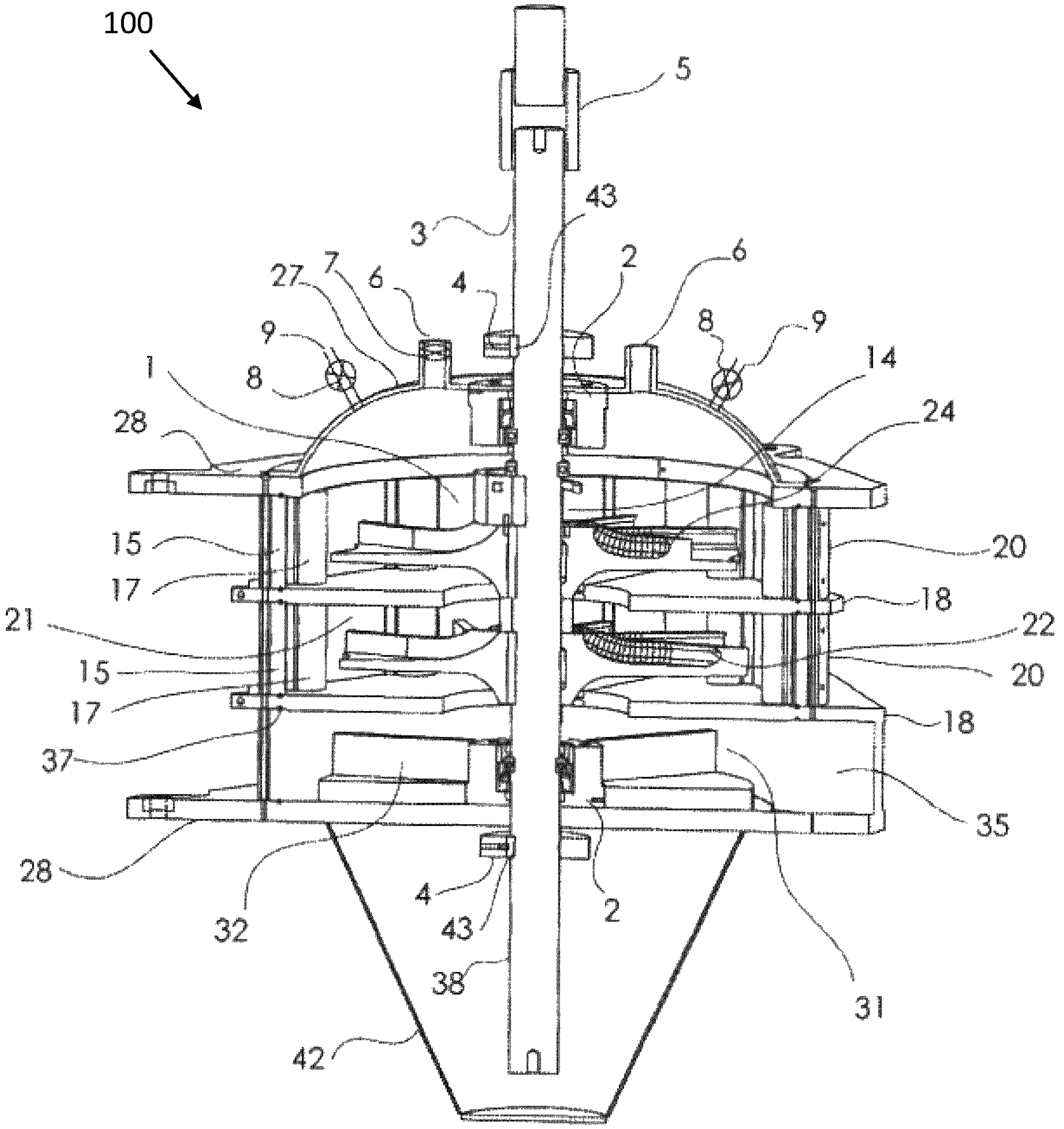
FIGS. 1-1E are diagrams showing a comminuting reactor.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Known milling techniques and apparatus, such as roller and ball mills, are generally based on either impact, shear or compression forces or a combination thereof. These forces mimic what nature has done for millions of years. A typical natural example is a river gradually breaking down riverbed rocks. Nature, as well as traditional milling techniques, tend to create variably sized round particles with passive surfaces. Any impurities in the original material, if malleable compared to the gangue material, are smeared into the gangue material and furthermore small fissures in the original intact source material are closed. Biological materials such as cell structures are broken, and its interiors spilled and exposed to degradation.

Some of these issues are specifically troublesome within the mining industry. Gone are the days of large solid concentrations of minerals. Today the industry is overwhelmingly faced with the challenge of liberating and separating micro-sized valuables in large volume source material. Ore must be crushed into small enough particles that chemical agents can leach the desired metal from the ore. If instead the same ore was processed in the Librixer device via Micronization and liberation along natural boundaries, such grind material could preferably be size or density separated prior to leaching and thereby save expensive and toxic chemicals for a significant smaller volume.

In today's large-scale food processing industries, such as juicing and fish filleting industries, huge volume of valuable food bi-products typically become either landfill or low value commodities such as fertilizers and local animal feed. There are no suitable techniques in the market today that allow for upgrade of these nutritional biproducts. A possible area of performance for the Librixer is to bring these valuable bi-products to a fine homogenous powder that can be used to fortify other food products as an ingredient by micronizing and liberate cell structures along natural boundaries. Maintaining intact cell walls allows successful rehydration of dehydrated food materials. Traditional known "no heat dehydration" will gently collapse cell structures by removing moisture. These collapsed cells can then gently be liberated from each other in the Librixer. The result is a homogenous fine powder that can be used as an ingredient in a wide range of different foods.

Typical devices for comminuting (or pulverizing) materials include a rotatable shaft within a housing, with rotor plates attached to the shaft and separated by baffles attached to the housing for directing flow. Material is introduced into one end of the housing, the rotor plates sequentially spin and agitate the material, and the pulverized material is removed from the other end of the housing. Comminuting devices of this sort quickly break down materials into small, uniform particles. U.S. Pat. No. 4,886,216 to Goble as well as two patents issued to one of the present inventors, U.S. Pat. Nos. 6,135,370 and 6,227,473 teach this sort of device.

FIG. 1A (prior art) shows a side cutaway view of a comminuting reactor by an inventor of the present invention (shown in U.S. patent application Ser. No. 13/698,140 and incorporated herein by reference). It was the objective of that invention to provide apparatus and methods which improve equipment life and allow for access to the interior of the apparatus. This comminuting reactor, shown in FIG. 1A (prior art) included inlet, one or more process and one discharge chambers. The chamber was constrained by retainer plates lined with floating wear plates and were separated by segmented divider plates. A rotating shaft extended through the device.

In one embodiment, the inlet chamber was located at the bottom of the reactor and had inlet ports through which material and fluids were drawn by suction.

The inlet chamber could also be at the top of the reactor and the material and fluid would in such configuration be gravity fed.

The inlet ports were oval to minimize bridging issues. The inlet chamber formed a dome shape to provide a volume for materials and fluids to impact each other and the dome to blend in a chaotic manner. The mixture was then organized into a fluid stream before transitioning into an adjacent processing chamber. In a preferred embodiment, an inlet rotor attached to the shaft had straight vanes leading from the shaft to the circumference. The vanes had bull-nose top edges as shown in FIG. 1D (prior art). The inlet rotor causes low pressure and sucks the mixture into the inlet chamber.

Figure 1B:
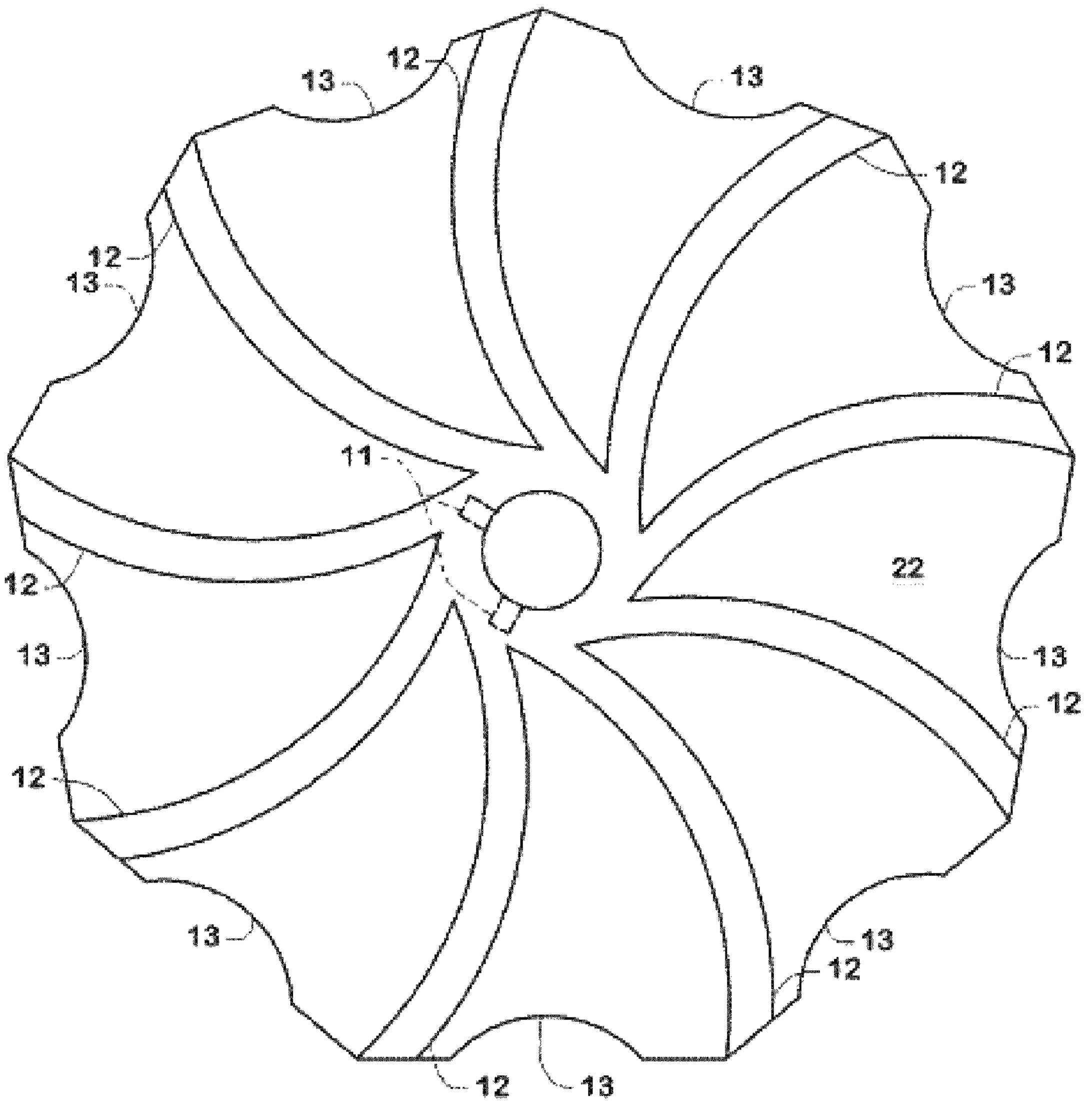
Figure 1C:
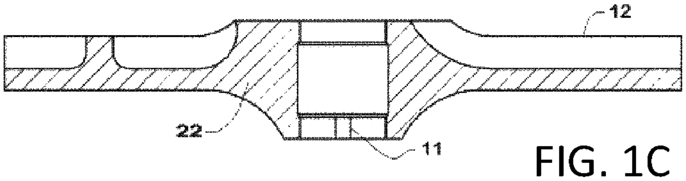
Figure 1D:
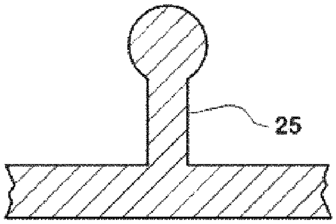
Figure 1E:
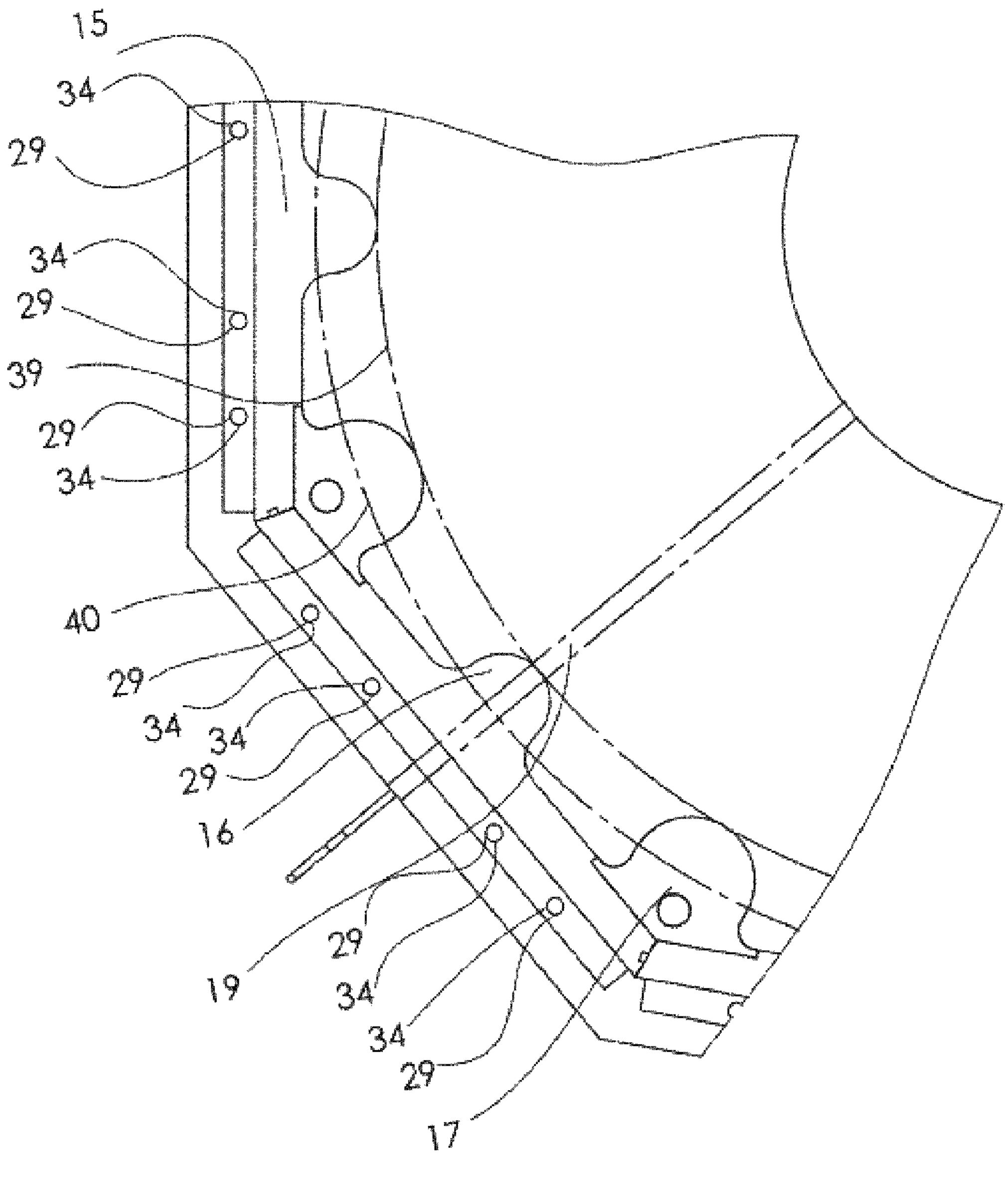

Vortex generators 16 were formed on the floating wear plates of the inlet chamber (see FIG. 1E, prior art). A secondary set of vortex generators 17 were located in each apex of the polygon shaped chamber. The inlet rotor forced the fluid and the material outwards and form it into a stream. When this stream interacted with the vortex generators, each vortex generator set up two counter-rotating, to the main stream, vortexes. Where the first "Primary" being the more forceful being set up on the side of the vortex generator facing the main stream. The actual primary and secondary is based on the rotation direction of the main materials stream, clockwise or counterclockwise rotation direction of the rotating assembly. The known Coanda effect will then via fluids adherence to a surface set up a similar, slightly less forceful, vortex on the other side, back side, of the vortex generator. One or several processing chambers could be used depending on the materials and desired level of comminution.

Most recent industrial focuses founded in a more circular economy awareness have added significant new area for liberation and micronization machinery of different waste streams that nowadays needs to be recycled and/or upcycled. For example, computer circuit boards and electric cables are no longer sent to Asia to be burned and recycled. Instead these electronic wastes are locally processed via liberation and separation into valuable clean waste streams.

These new trends have put significant new demands on the invention by the inventor.

Each processing chamber included a processing rotor plate 22 to control the flow and optimize comminution and equipment life. See FIGS. 1B and 1C (prior art). In each processing chamber, the mixture stream entered near the center of the chamber as guided by the segmented split divider plates forming its entry. The rotor plate 22 forced the stream outward toward the chamber's floating wear plates. The mixture flow was forced outward by rotor vanes 12 and encountered these vortex generators, which, due to their shape and location, caused material particles to swirl back against the main flow and collide in the fluid. The collisions caused the particles to break along natural boundaries. In this sort of random, high frequency collision environment, one side of a colliding particle tends to contract while the other opposite side tends to stretch. If repeated numerous times the end-result is comminution with jagged edges and unique aspect ratios. In a preferred embodiment, each processing chamber rotor had a scalloped circumference with vanes that originate from the central hub and radiated in a curved shape to the circumference. The scallops were offset towards the convex side of each vane. The purpose of the scallops is to minimize physical wear on the rotor edge as the material makes a turn downwards or upwards into the next following process chamber. The fluid/material mixture was centrifugally forced to the wear plates where the mixture encountered the vortex generators.

A discharge chamber followed the segmented divider plate of the last processing chamber. The discharge rotor was round and had straight vanes that originated at its central hub and terminate at its circumference. The vane height was greater than that of the processing rotor vanes. The material was discharged laterally through single or multiple discharge ports or volutes.

In a preferred embodiment, the horizontal chamber, comprising retainer plates restrained by the segmented split divider plates, positioned the floating wear plates to form a polygon shaped chamber. This design allowed open access to the interior of the reactor. The segmented split divider plates were hinged on rods that allow a segment to open and move away from the shaft and rotor plates. Exterior recessed mounted bearing housings were located outside either end of the reactor. A balancing ring was mounted on the shaft of the comminution reactor just beyond the bearing housings. The comminution reactor mounting was designed to allow for the inversion of the entire comminution reactor.

While the comminution reactor of U.S. patent application Ser. No. 13/698,140 worked well in many respects, a need remains in the art for improved apparatus and methods for comminuting materials along natural boundaries.

Figure 2:
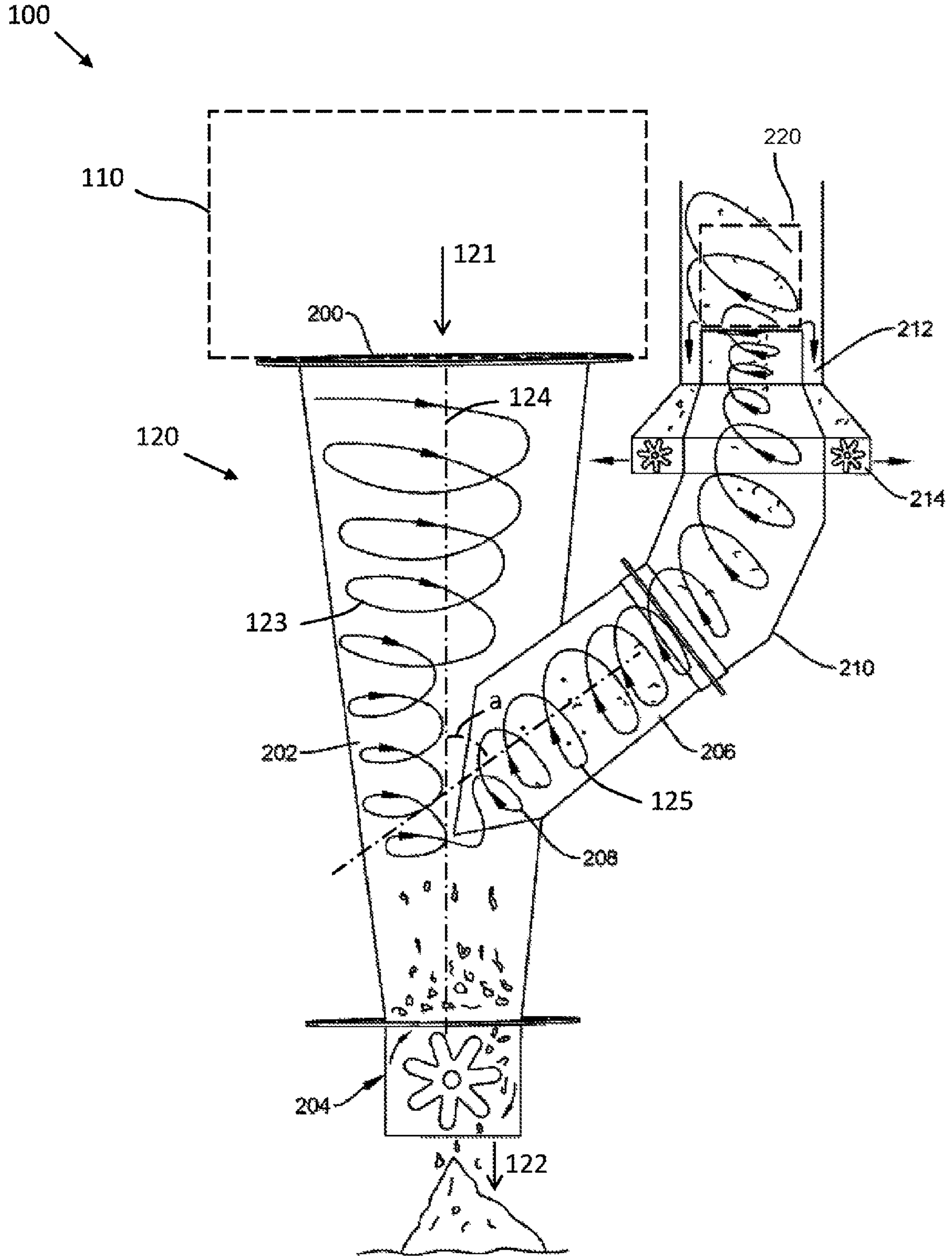
FIG. 2 is side cutaway diagram showing an example discharge cone.

FIG. 2 is a schematic side view of a discharge cone 200 according to the present invention. The discharge cone is attached to the output of a comminution reactor such as that shown in FIGS. 1A-E (prior art). FIG. 2 shows the air and small particle fluid mix in the take out airduct with one or more particle classification baffles.

More specifically, there is disclosed herein a discharge arrangement 120 for a comminution reactor assembly 100. The discharge arrangement 120 comprises a main chamber 202 extending along a main axis 124. The main chamber has an inlet 121 arranged to be fluidly connected to a comminution reactor 110 and an outlet 122 arranged opposite from the inlet 121 along the main axis 124. The outlet 122 is closeable by a common material take-out valve 204.

The fluid-material stream, comprising a fluid such as air along with processed material, exits the comminution reactor spinning at high velocity. At the outlet of the comminutor such fluid-material stream is either spinning clockwise or counterclockwise depending on the rotation direction of the rotor assembly inside the comminutor. Depending on material and energy injected in the comminutor such particle stream may consists of particles down below one micron. It is common knowledge that separation of particles below 100 microns demand certain special equipment and, for many materials, become extremely slow and complicated if not impossible.

As the fluid-material stream exits the final processing chamber in the comminutor, it is collected in a cone shaped discharge tube 202 with a common material take out valve 204 of some kind generally at the very bottom. It is preferable that the cone has a certain length suitable for different processes allowing processed material to accumulate on top of the discharge valve. The main chamber 202 (i.e. discharge tube 202) may comprise a conical shape arranged to support the helical path fluid fluid-material stream 123 from the inlet 121 towards the outlet 122. More generic shapes, other than a cone, of the main chamber are also possible. In general, the main chamber 202 is arranged to support a fluid-material stream 123 along a helical path about the main axis 124 from the inlet 121 towards the outlet 122. Preferably though, the main chamber 202 is configured with a tubular shape arranged to support the helical path fluid-material stream 123 from the inlet 121 towards the outlet 122. In an example embodiment, the main chamber length between inlet 121 and outlet 122 along main axis 124 is between 1000 and 2000 mm, with an inlet opening between 500 and 1000 mm depending on the size of the comminutor and an outlet opening between 250 mm and 500 mm depending on the takeout valve arrangement. As an example, a volume of the main chamber 202 is between 1 and 1.5 cubic meters.

The discharge arrangement 120 further comprises an airduct 206 arranged extending into the main chamber 202 at an acute angle a with respect to the main axis 124. About one third from the bottom of cone 202 an airduct 206 is attached to the cone. In other words, the airduct 206 extends into the main chamber 202 at a point about one third of the distance from the outlet 122 to the inlet 121. The airduct 206 may, however, also be arranged at other distances from the bottom of the cone, i.e. the outlet, such as half of the distance from the outlet 122 to the inlet 121. This airduct is facing upwards at a steep angle of around 70-80 degrees from horizontal until the duct is free from the cone and then turned straight up, 90 degrees from horizontal. Other acute angles are also possible. Preferably, however, the acute angle a is between 60-85 degrees, and more preferably between 70-80 degrees, measured with respect to a plane normal to the main axis 124. At the point where the airduct is free from the main chamber, the airduct may, as mentioned, be arranged to turn such that it is parallel to the main chamber. Other arrangements of the airduct at this point are also possible. The inlet 208 to the airduct 206 extends inwards and down inside the cone 202. This inside extension length and shape will force the fluid-material stream to make a very sharp 160-170 degree turn from a downward spiral around the inside edges of the cone to an upward spiral inside the airduct. During the sharp turn the air will lose heavier (larger or denser) particles. These particles will drop down to the bottom of the cone above the takeout valve 204. In other words, the airduct 206 comprises an aperture arranged facing the outlet 122. This way, a portion 125 of the fluid-material stream 123 changes direction from the helical fluid-material stream 123 about the main axis 124 from the inlet 121 towards the outlet 122 to a helical flow inside the airduct 206.

To summarize, there is disclosed herein a discharge arrangement 120 for a comminution reactor assembly 100. The discharge arrangement 120 comprises a main chamber 202 extending along a main axis 124. The main chamber has an inlet 121 arranged to be fluidly connected to a comminution reactor 110 and an outlet 122 arranged opposite from the inlet 121 along the main axis 124. The outlet 122 is closeable by a common material take-out valve 204. The main chamber 202 is arranged to support a fluid-material stream 123 along a helical path about the main axis 124 from the inlet 121 towards the outlet 122. The discharge arrangement 120 further comprises an airduct 206 arranged extending into the main chamber 202 at an acute angle a with respect to the main axis 124.

According to aspects, the discharge arrangement 120 is arranged to generate a pressure gradient configured to draw the portion 125 of the fluid-material stream 123 into the airduct 206. This may facilitate control of the fluid-material stream 123. The pressure gradient may be generated by arranging a higher pressure at the inlet 121, relative to an ambient pressure, and thereby also relative to the pressure at an output of the airduct. Alternatively, or in combination of, the pressure gradient may be generated by arranging a lower pressure at the output of the airduct, relative to the ambient pressure and to the pressure at inlet 121. Arranging high and/or low pressure may be done with a fan, blower, or compressor type arrangement.

The airduct 206 may comprise a bend 210 to change extension direction of the airduct 206 into a direction substantially parallel to the main axis 124. In that case, a first separator 212 may be arranged after the bend 210 to separate a fraction of particles from the portion of the helical fluid-material stream 125. In an example embodiment, and as the air and particles of lesser size or density in the remaining fluid-material stream moves upwards in the air discharge tube 206 beyond the bend 210 and well inside the vertical airduct, it will pass through a first cone baffle 212. In other words, the first separator 212 may be a cone baffle arranged to restrain the portion of the helical fluid-material stream 125. Thereby, the fluid-material stream becomes restrained inside the baffle and both pressure and velocity increase dramatically. Right at the exit from the restraining baffle, the fluid-material stream will experience a sudden large increase in the tube wall diameter and both velocity and pressure will suddenly drop. This sudden change in pressure will force larger or more dense particles to drop off from the continuing fluid-material stream and such particles are then collected via a circular slot 214 outside the sides of the baffle between the baffle and the air tube. The first separator 212 may comprise one or more pneumatic valves arranged to discharge collected particles, i.e. the fraction of particles from the portion of the helical fluid-material stream 125 that has been separated. A number of pneumatic valves around the outside tube will allow these particles to be collected without releasing any air and dust into the ambient atmosphere.

Depending on material and airflow, several similar designed cone baffles 212 can be stacked in a vertical series within suitable adjustable distances between the baffles according to the makeup and velocity of the fluid-material stream. In other words, a plurality of separators 212 may be arranged in series after the bend 210 to separate respective fractions of particles from the portion of the helical fluid-material stream 125. The distance between the first baffle and following baffles can be adjusted in length to accommodate optimum particle distribution between the different baffle take-outs. The airduct 206 may be terminated by a filter bag compartment. As the fluid-material stream exists the last baffle, the remaining ultra-fine particles together with the air is discharged into a conventional bag house (not shown).

Depending on mechanical characteristics of the processed material and result product demands, these ultra-small particles can be of great value or of no value. For certain ultra-small particle fluid streams, it is of interest to accomplish a further fractionation into two or more fractions based on material density and particle velocity. The Librixer standard process of micronization and liberation depend on vigorous air flow generated internally by the vertical rotor assembly. It is a smart energy policy to use this flow for further fractionation of ultra-fine particles when compared with just letting it become disbursed via common filters in a traditional bag house.

Depending on material and airflow, several similar designed baffles can be stacked within suitable variable distances of each other. It is known how difficult it is to capture and separate ultra-small particle of 30 micron or less. By utilizing the material and air movement already established inside the Librixer such separation of ultra-small particles can be accomplished by this invention at no additional energy at significant less cost when compared with more traditional cyclones commonly used for trapping particles in air.

There is also disclosed herein a comminution reactor assembly 100 comprising a comminution reactor 110 and a discharge arrangement 120 according to the discussions above.

Figure 3:
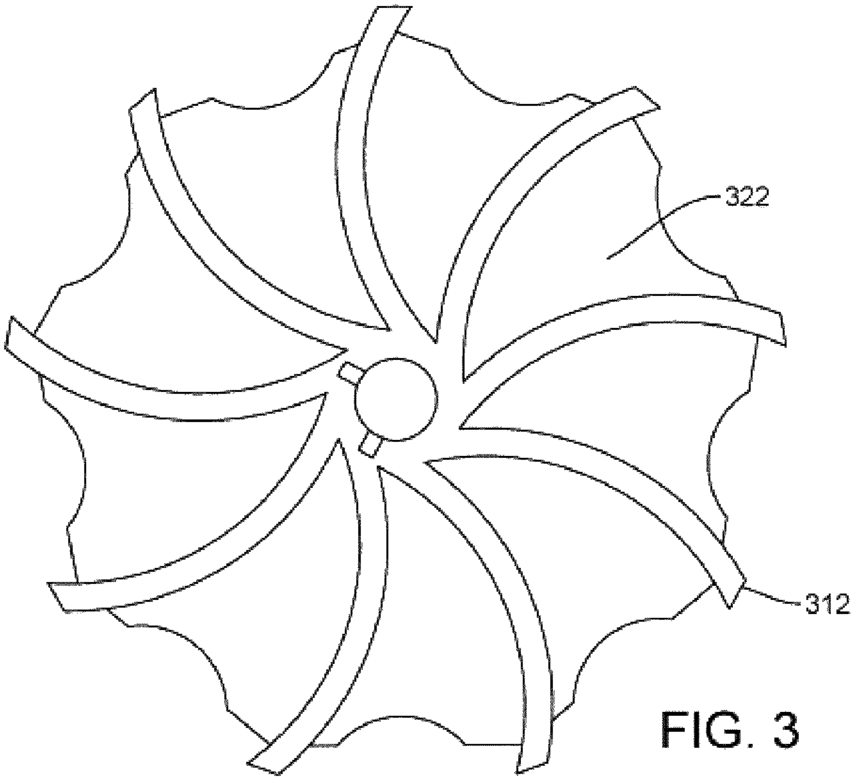
FIG. 3 is a top view of an example processing rotor.
Figure 4A:
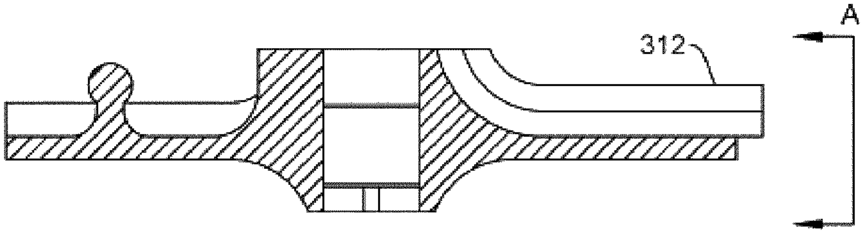
FIG. 4A is a side cutaway view of the processing rotor of FIG. 3.
Figure 4B:
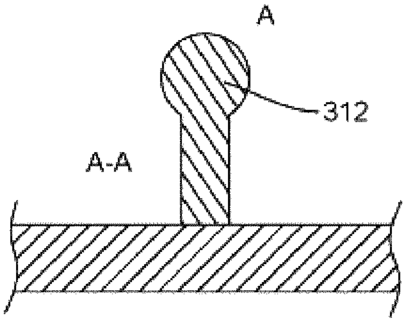
FIG. 4B is an expanded side cutaway view of the inlet rotor vane of FIG. 4A.

FIG. 3 is a top view of a comminution reactor processing rotor 322 according the present invention. FIG. 4A is a side cutaway view of the processing rotor 322 of FIG. 3. FIG. 4B is an expanded side cutaway view of inlet rotor vane 312 of FIG. 4A.

This processing rotor 322 has been improved by extending the vane configuration 312 beyond the perimeter of the rotor plate compared to a previous rotor plate (see FIGS. 1B and 1C, prior art). This increases the life of the comminution reactor and the processing rotor, because the fluid mixture pouring over the edge of the processing rotor vane tip does not immediately scrub the underside of the processing rotor. Instead it is travels outward past the perimeter of the processing rotor and minimizes the wear from the fluid-material stream underneath the processing rotor. The vanes 312 may include a round bullnose top (akin to that shown in FIG. 1D, prior art) that also extends beyond the circumference of the processing rotor 322, increasing the turbulence of the commuting fluid-material stream above the height of the vanes prior to being gathered and organized within the fluid stream outwards. Therefore, there is also disclosed herein a processing rotor 322 for a comminution reactor 110. The processing rotor 322 comprising a vane configuration 312 arranged extending beyond a perimeter of a rotor plate to which the vane configuration is mounted.

Figure 5:
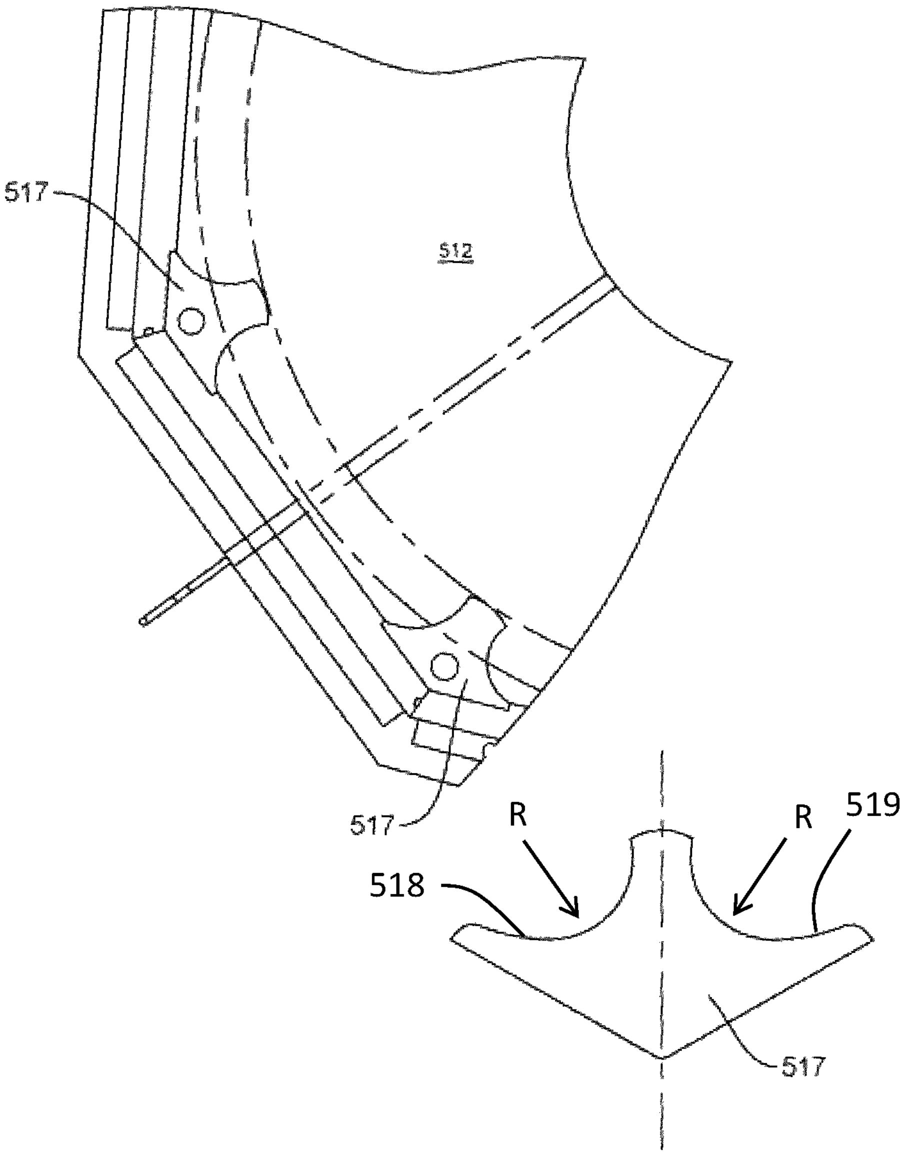
FIG. 5 is a top view of a portion of an example spoon shaped vortex generator placed in one of the apex corners.

FIG. 5 is a is a top view of a portion of a processing rotor 512 according the present invention. This processing rotor is improved by providing reverse-spoon-shaped vortex generators 517 in place of the prior art omega-shaped vortex generators 17 (see FIG. 1E, prior art). The improved shape resembles two table spoons laid back to back, where the convex sides of the two spoons are touching each other yet allowing the "Coanda Effect" to drag the fluid stream around the front and into the second "secondary" vortex generator side. This secondary vortex generator will be slightly weaker when compared with the primary vortex. Their positions and functions will be reversed should the comminution reactor be run in a counterclockwise fashion. Therefore, there is also disclosed herein a reverse spoon shaped vortex generator 517 for causing vortexes in a material fluid stream spinning in opposition to a main flow of the material passing the vortex generator. The reverse spoon shaped vortex generator 517 comprises a first 518 and a second 519 arcuate surface with respective curvatures R. The first and a second arcuate surface are arranged in a mirrored configuration. A lesser R value will create a stronger smaller vortex spinning at higher velocity while generating higher heat and consuming more energy. One or more reverse spoon shaped vortex generator may be placed in all or some mid points of the flat wall plates, in all or some apex corner within one or all process chambers. Such formed vortex generators placed in the mid-point of the flat wall segment is smaller than any generator placed in the apexes of the processing chamber between two flat wall sections. The innermost edge of all such vortex generators form an inscribed circle allowing space between such circle and a similar circle created by the edges of the polygon shaped rotor. The reverse spoon shaped vortex generator comprises of two reverse-spoon-shaped forms where the curvature R may vary depending on processed material.

Furthermore, there is disclosed herein a comminution reactor, i.e. an apparatus for comminuting material. The apparatus comprises a spinnable shaft 3 and rotor plates 22, 24, 32 attached to the shaft. The apparatus further comprises wear plates 15 forming a polygon shaped process chamber 1, 21, 31 parallel to the shaft. The chamber has an inlet surface 27 at an inlet end and a discharge surface 36, 35 at a discharge end. The apparatus also comprises segmented plates 18 disposed between the rotors. The segmented plates extend through the wear plates inward toward the shaft. A portion of the segmented plates and adjacent wear plates form an assembly constructed to open away from the shaft and the rotors. The apparatus further comprises a first set of vortex generators 16 formed on the wear plates 15 of the inlet chamber, and a secondary set of vortex generators 517 arranged in each or fewer of the apexes of the polygon shaped process chamber 1, 21, 31. The vortex generators are constructed and arranged to cause vortexes in the material spinning in opposition to a main flow of the material. At least one vortex generators in the secondary set of vortex generators is a reverse-spoon-shaped vortex generator 517.

Vortex generators may have different shapes, such as earlier invention by the inventor resemble the Greek letter omega. Test runs have shown the need for different shapes and sizes of vortex generator and present invention show a reverse-double-spoon shaped vortex generator that will generate very strong chaotic reverse turbulence and pressure changes, which is an advantage for certain materials.

Prior art by the inventor describes the ability of the comminutor to process dry or wet materials as well as slurries. The present invention further enhances the ability of the comminutor to micronize materials completely submerged by removing both upper and lower bearings and operating the comminutor in a fashion commonly known as "pump configuration". Such set-ups are used, for example, in waste water treatment facilities around the world. By removing both lower and upper bearings the comminutor can operate even full submerged in a liquid. In such configuration the coupling between comminutor and drive motor is preferably done via a fixed shaft coupling. Existing motor bearings are removed and replaced with new bearing housings and bearings able to take the increased load from the rotor assembly.

In a comminution reactor , the material may be gravity fed into the first vertical process chamber, where the material mixed with the fluid, most commonly ambient air, interact in space with each other as the material is exposed to a high frequency mix of different forces set up and controlled by material volume and speed. As it reaches its maximum distance from the process chamber center, restrained by the process chamber walls, its spins around creating a circular material fluid curtain. In this circular spinning vortex, smaller counter-rotating vortexes are set up by special designed vortex generators of different sizes and shapes. Similar processes are set up in the following process chambers below. As the particles become smaller by different forces, they will by weight occupy a larger volume. In the process chamber below, a lower pressure will draw finer particles out from the rotor edges and the material will be dropped and restrained by a divider plate below the process chamber rotor. Being released by the prior process chamber, it is now instead affected by the next process chamber and sucked back in towards the center shaft below the rotor above the divider plate. The divider plate's main function is to restrain the material flow from dropping down entering the next process stage and thereby creating havoc with material already in that chamber. As the material fluid gets closer to the shaft, it becomes compressed in space. The divider plate has a central round opening allowing both space for the vertical shaft and compressed material and fluid to enter the next process chamber. As it enters the opening and have become compressed, it rapidly become released above the spinning rotor in the process chamber and it is again spun outwards. The system design will allow for more space and the result is a high frequent sonic thump wave as the material spins outward. The same forces are then moving liberated and comminuted material further down through the different following, most commonly identical, process chambers. In each following process chamber, processed material will interact with ever smaller and lighter weighing particles in an ever-increasing number. The equipment must therefore consist of at least one complete process chamber.

The invention claimed is:

1. A discharge arrangement (120) for a comminution reactor assembly (100), the discharge arrangement (120) comprising a main chamber (202) extending along a main axis (124), the main chamber having an inlet (121) arranged to be fluidly connected to a comminution reactor (110) and an outlet (122) arranged opposite from the inlet (121) along the main axis (124) and closeable by a common material take-out valve (204), wherein the main chamber (202) is configured with a conical shape which is arranged to support a fluid-material stream (123) along a helical path about the main axis (124) from the inlet (121) towards the outlet (122), the discharge arrangement (120) further comprising an airduct (206) arranged extending into the main chamber (202) at an acute angle (a) with respect to the main axis (124), the airduct (206) comprising an aperture arranged facing the outlet (122), whereby a portion (125) of the fluid-material stream (123) changes direction from the helical fluid-material stream (123) about the main axis (124) from the inlet (121) towards the outlet (122) to a helical flow inside the airduct (206).

2. The discharge arrangement (120) according to claim 1, wherein the discharge arrangement (120) is arranged to generate a pressure gradient configured to draw the portion (125) of the fluid-material stream (123) into the airduct (206).

3. The discharge arrangement (120) according to claim 1, wherein the main chamber (202) is configured with a tubular shape arranged to support the helical path fluid-material stream (123) from the inlet (121) towards the outlet (122).

4. The discharge arrangement (120) according to claim 1, wherein the main chamber length between inlet (121) and outlet (122) along main axis (124) is between 1000 and 2000 mm.

5. The discharge arrangement (120) according to claim 1, wherein a volume of the main chamber (202) is between 1 and 1.5 cubic meters.

6. The discharge arrangement (120) according to claim 1, wherein the airduct (206) extends into the main chamber at a point about one third of the distance from the outlet (122) to the inlet (121).

7. The discharge arrangement (120) according to claim 1, wherein the acute angle (a) is between 60-85 degrees, measured with respect to a plane normal to the main axis (124).

8. The discharge arrangement (120) according to claim 1, wherein the airduct (206) comprises a bend (210) to change an extension direction of the airduct (206) into a direction substantially parallel to the main axis (124), wherein a first separator (212) is arranged after the bend (210) to separate a fraction of particles from the portion of the helical fluid-material stream (125).

9. The discharge arrangement (120) according to claim 8, wherein the first separator (212) is cone baffle arranged to restrain the portion of the helical fluid-material stream (125).

10. The discharge arrangement (120) according to claim 8, wherein the first separator (212) comprises one or more pneumatic valves arranged to discharge collected particles.

11. The discharge arrangement (120) according to claim 8, wherein a plurality of separators (212) is arranged in series after the bend (210) to separate respective fractions of particles from the portion of the helical fluid-material stream (125).

12. The discharge arrangement (120) according to claim 1, wherein the airduct (206) is terminated by a filter bag compartment (220).

13. A comminution reactor assembly (100) comprising a comminution reactor (110) and a discharge arrangement (120) according to claim 1.

14. The discharge arrangement (120) according to claim 7, wherein the acute angle (a) is between 70-80 degrees, measured with respect to a plane normal to the main axis (124).

15. A discharge arrangement (120) for a comminution reactor assembly (100), the discharge arrangement (120) comprising a main chamber (202) extending along a main axis (124), the main chamber having an inlet (121) arranged to be fluidly connected to a comminution reactor (110) and an outlet (122) arranged opposite from the inlet (121) along the main axis (124) and closeable by a common material take-out valve (204), wherein the main chamber (202) is arranged to support a fluid-material stream (123) along a helical path about the main axis (124) from the inlet (121) towards the outlet (122), the discharge arrangement (120) further comprising an airduct (206) arranged extending into the main chamber (202) at an acute angle (a) with respect to the main axis (124), the airduct (206) comprising an aperture arranged facing the outlet (122), the airduct further comprising a bend (210) to change an extension direction of the airduct (206) into a direction substantially parallel to the main axis (124), whereby a portion (125) of the fluid-material stream (123) changes direction from the helical fluid-material stream (123) about the main axis (124) from the inlet (121) towards the outlet (122) to a helical flow inside the airduct (206).

16. The discharge arrangement (120) according to claim 15, wherein a first separator (212) is arranged after the bend (210) to separate a fraction of particles from the portion of the helical fluid-material stream (125).

17. The discharge arrangement (120) according to claim 16, wherein the discharge arrangement (120) is arranged to generate a pressure gradient configured to draw the portion (125) of the fluid-material stream (123) into the airduct (206).

18. The discharge arrangement (120) according to claim 16, wherein the main chamber (202) comprises conical shape arranged to support the helical path fluid fluid-material stream (123) from the inlet (121) towards the outlet (122).

19. The discharge arrangement (120) according to claim 16, wherein the airduct (206) extends into the main chamber at a point about one third of the distance from the outlet (122) to the inlet (121).

20. The discharge arrangement (120) according to claim 16, wherein the acute angle (a) is between 60-85 degrees, measured with respect to a plane normal to the main axis (124).

* * * * *